US010331417B2

(12) United States Patent
Kobayashi et al.

(10) Patent No.: US 10,331,417 B2
(45) Date of Patent: Jun. 25, 2019

(54) VERIFICATION OF CHANGES IN UML MODEL BASED ON CHANGE PLAN

(71) Applicant: International Business Machines Corporation, Armonk, NY (US)

(72) Inventors: Yusuke Kobayashi, Narashino (JP); Kiyonori Komiya, Kawasaki (JP); Takashi Nerome, Yokohama (JP); Shuhichi Saitoh, Funabashi (JP); Toshiaki Yasue, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 15/479,357

(22) Filed: Apr. 5, 2017

(65) Prior Publication Data

US 2018/0293055 A1 Oct. 11, 2018

(51) Int. Cl.
*G06F 8/20* (2018.01)
*G06F 8/10* (2018.01)
*G06F 8/35* (2018.01)

(52) U.S. Cl.
CPC ............... *G06F 8/20* (2013.01); *G06F 8/10* (2013.01); *G06F 8/35* (2013.01)

(58) Field of Classification Search
None
See application file for complete search history.

(56) References Cited

U.S. PATENT DOCUMENTS

| 6,839,724 | B2 | 1/2005 | Manchanda et al. |
| 2004/0210607 | A1* | 10/2004 | Manchanda ...... G06F 17/30592 |
| 2007/0006130 | A1* | 1/2007 | Stamler ...................... G06F 8/71 |
| | | | 717/104 |

| 2009/0150855 | A1* | 6/2009 | Elaasar ..................... G06F 8/10 |
| | | | 717/104 |

FOREIGN PATENT DOCUMENTS

| WO | 2007041901 A1 | 4/2007 |
| WO | 2016008085 A1 | 1/2016 |

OTHER PUBLICATIONS

Backstrom et al. "Verification and Correction of UML Models", Attentec Whitepaper; Dec. 2006.
Briand et al. "Impact Analysis and Change Management of UML Models", Proceedings of the International Conference on Software Maintenance (ICSM'03); Sep. 2003.

* cited by examiner

*Primary Examiner* — Lewis A Bullock, Jr.
*Assistant Examiner* — Mark A Gooray
(74) *Attorney, Agent, or Firm* — Brown & Michaels, PC; David Woycechowsky

(57) ABSTRACT

Automatic verification of changes in a UML model made based on a change plan using a learning mode and a verification mode. In the learning mode, UML model differences are obtained between the UML model prior to the change and after the change, difference mapping is defined and a mapping metamodel is automatically extracted from the difference mapping. In the verification mode, planned difference mapping is created based on applying the mapping metamodel in the learning mode to a design change plan. Actual difference mapping based on the design change work is created and the planned difference mapping is compared to the actual difference mapping to see if additional changes to the mapping metamodel are needed.

12 Claims, 12 Drawing Sheets

Difference Learning Mode

VERIFICATION OF CHANGES IN UML MODEL BASED ON CHANGE PLAN

BACKGROUND

The present invention relates to unified modeling language models (UML), and more specifically to automatic verification of changes in unified modeling language models based on a change plan.

When any change has to be made to a unified modeling language (UML) model, it is necessary to change the UML model in a planned manner in accordance with a predefined schedule, taking into account multiple factors including data model changes and interface change requests.

A user or administrator skimming a list of a large number of changes cannot facilitate verification and determination regarding whether or not the change or changes at issue are the intended changes and have the expected change types, since various changes occur at many locations for compliance with the UML structure. Without verification of the changes, there is considerable risk of failures occurring in subsequent UML-based change development.

SUMMARY

According to one embodiment of the present invention, a method of learning and verifying differences to generate a mapping metamodel of a unified modeling language model is disclosed. The method comprising the steps of: a computer defining a schedule change plan based on a change request received from an administrator; the computer defining and executing a change task based on the change request to control the operations and tasks associated with changes to the unified modeling language model; the computer confirming completion of the change task on the unified modeling language model; the computer obtaining unified modeling language model differences by comparing the unified modeling language model prior to the change task being executed and the unified modeling language model after the change task has been completed; the computer mapping the unified modeling language model differences by comparing the differences versus the result differences to indicate what changes were made as intended during the change schedule to create model difference mapping; and the computer extracting a mapping metamodel from the difference mapping.

According to another embodiment of the present invention, a computer program product for learning and verifying differences to generate a mapping metamodel of a unified modeling language model is disclosed. The computer program product comprising a computer comprising at least one processor, one or more memories, one or more computer readable storage media, the computer program product comprising a computer readable storage medium having program instructions embodied therewith. The program instructions executable by the computer to perform a method comprising: defining, by the computer, a schedule change plan based on a change request received from an administrator; defining, by the computer, and executing a change task based on the change request to control the operations and tasks associated with changes to the unified modeling language model; confirming, by the computer, completion of the change task on the unified modeling language model; obtaining, by the computer, unified modeling language model differences by comparing the unified modeling language model prior to the change task being executed and the unified modeling language model after the change task has been completed; mapping, by the computer, the unified modeling language model differences by comparing the differences versus the result differences to indicate what changes were made as intended during the change schedule to create model difference mapping; and extracting, by the computer, a mapping metamodel from the difference mapping.

According to another embodiment of the present invention, a computer system for learning and verifying differences to generate a mapping metamodel of a unified modeling language model is disclosed. The computer system comprising a computer comprising at least one processor, one or more memories, one or more computer readable storage media having program instructions executable by the computer to perform the program instructions. The program instructions comprising: defining, by the computer, a schedule change plan based on a change request received from an administrator; defining, by the computer, and executing a change task based on the change request to control the operations and tasks associated with changes to the unified modeling language model; confirming, by the computer, completion of the change task on the unified modeling language model; obtaining, by the computer, unified modeling language model differences by comparing the unified modeling language model prior to the change task being executed and the unified modeling language model after the change task has been completed; mapping, by the computer, the unified modeling language model differences by comparing the differences versus the result differences to indicate what changes were made as intended during the change schedule to create model difference mapping; and extracting, by the computer, a mapping metamodel from the difference mapping.

DETAILED DESCRIPTION

Figure 1:
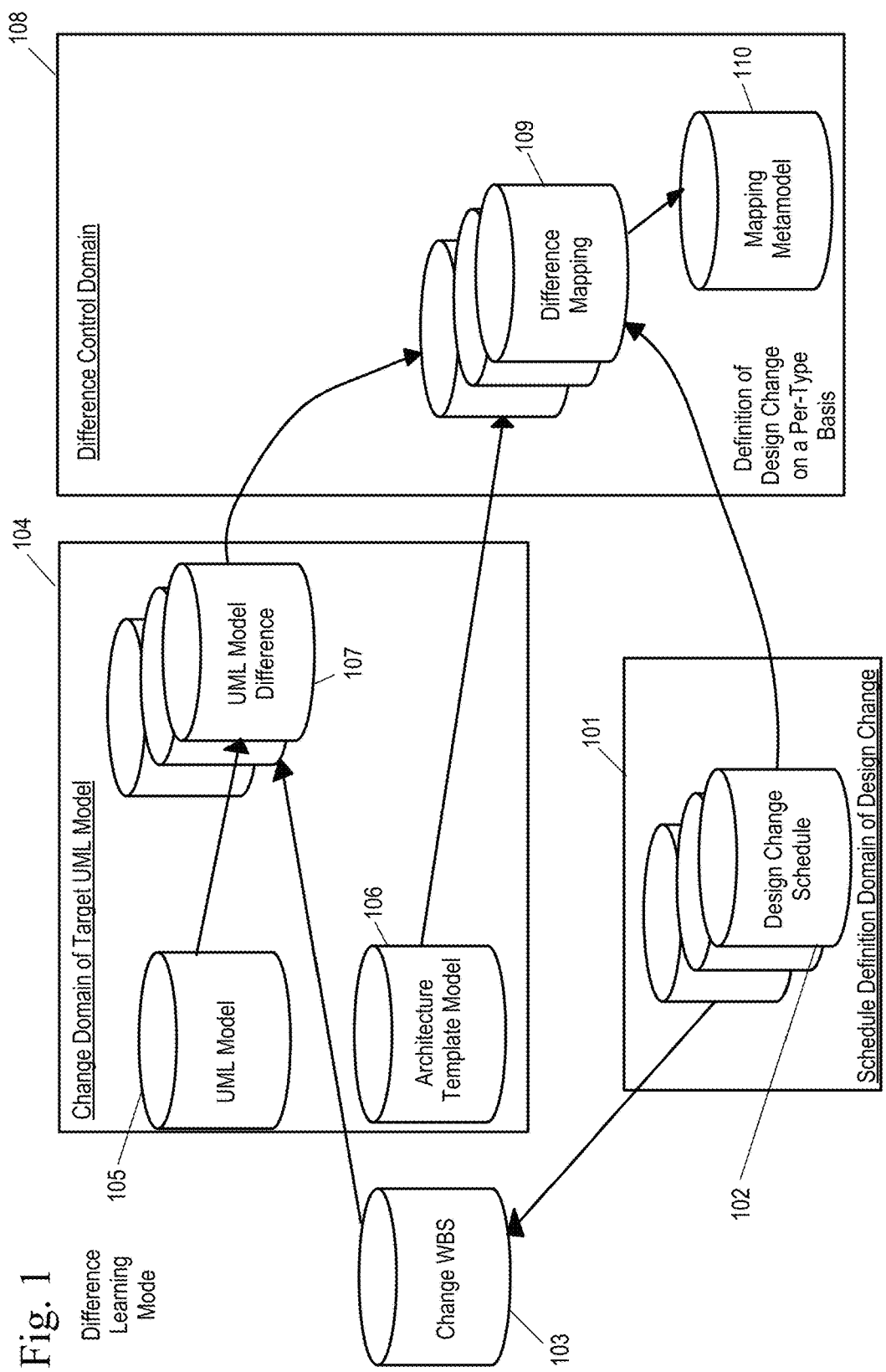
FIG. 1 shows a diagram of an example of a system architecture for generating a mapping metamodel.

In an embodiment of the present invention, automatic verification is used to verify whether or not a UML model has been changed as requested. Automatic verification of changes in a UML model made based on a change plan using a learning mode and a verification mode. In the learning mode, UML model differences are obtained between the UML model prior to the change and after the change, difference mapping is defined and a mapping metamodel is automatically extracted from the difference mapping. In the verification mode, planned difference mapping is created based on applying the mapping metamodel in the learning mode to a design change plan. Actual difference mapping based on the design change work is created and the planned difference mapping is compared to the actual difference mapping to see if additional changes to the mapping metamodel are needed FIG. 1 shows a diagram of an example of a system architecture for generating a mapping metamodel during a difference learning mode.

A schedule definition domain of a design change 101 is in communication with a change work breakdown structure (WBS) repository 103. The schedule definition domain 101 includes a design change schedule repository 102. The design change schedule repository 102 is also in communication with a difference mapping repository 109 of the difference control domain and sends definitions of design change on a per-type basis. The initial operation time, which is the planned duration of time for changing the UML model is defined in the design change schedule.

The schedule definition domain of design change 101 can send a change task to the WBS repository 103, which can include definitions on a per-type basis, such as data model change and interface change, as well as the operation time to determine the intervals of difference extraction.

The change WBS repository 103 is in communication with a change domain of the target UML model 104. The change domain of the target UML model 104 has a UML model repository 105, an architecture template model repository 106, and UML model difference repository 107 containing the create, delete, and update changes. The change domain of the target UML model 104 is communication with a difference control domain 108. The change WBS repository 103 can track and update the operation time based on the actual change work executed by the change WBS.

A final operation time may be calculated when the change to the UML model is complete and the final operation time is used to determine a difference execution interval. The difference execution interval is defined by calculating the start time and the end time of the change task.

The difference control domain 108 has a difference mapping repository 109 and a mapping metamodel repository 110. Difference mapping is defined by a spreadsheet.

To achieve the automatic verification, two modes are used: Learning Mode and Verification Mode.

In the Learning Mode, the Mapping Metamodel is automatically created by extracting the differences between models and associated with the design components and architecture templates. One example obtains UML model differences between the UML model before the change task and the UML model after the change task has been completed, defines the difference mapping, and automatically extracts the mapping metamodel from the difference mapping.

Figure 3:
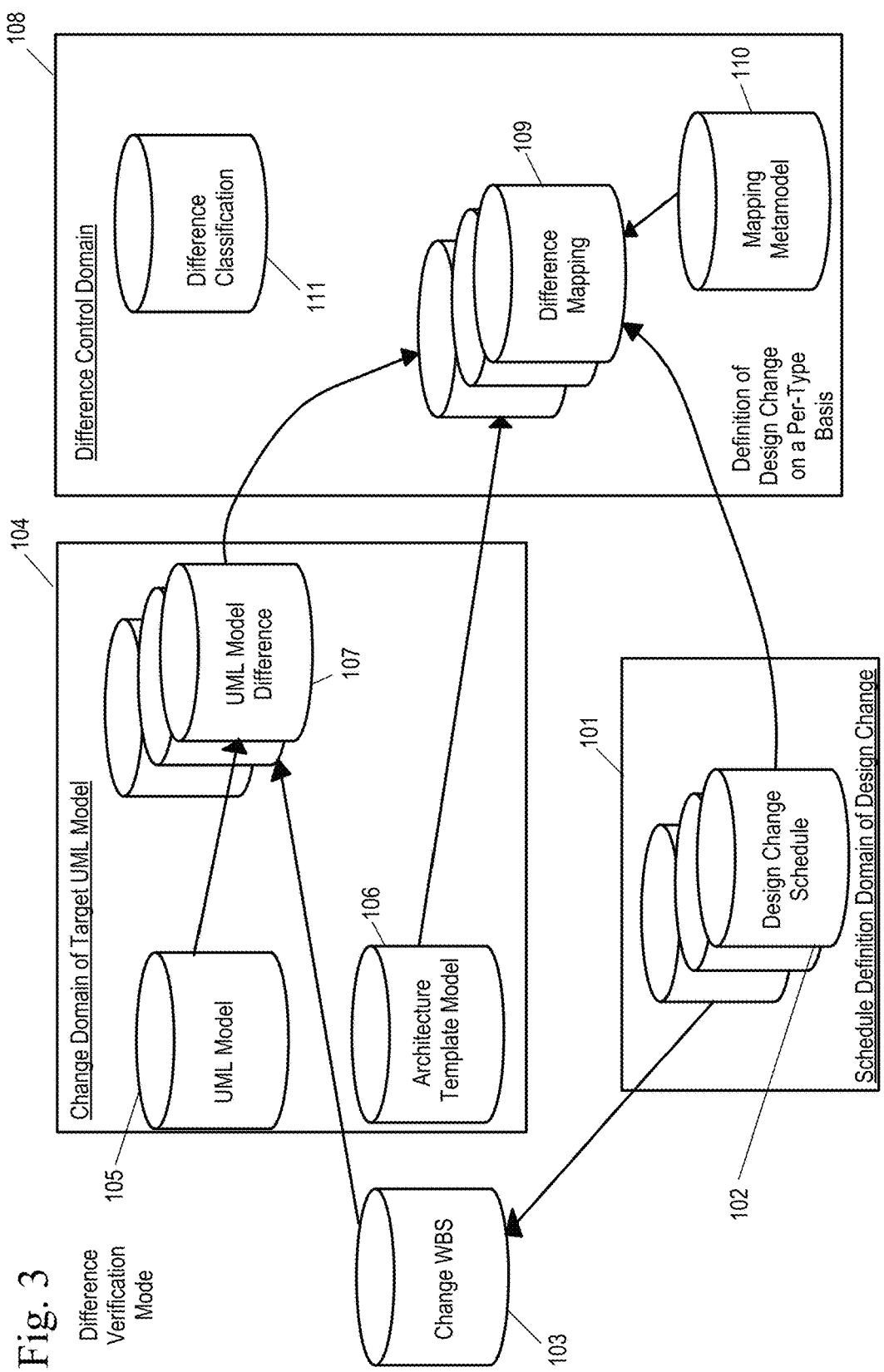
FIG. 3 shows a diagram of an example of a system architecture for verification of a UML model using the mapping metamodel.
Figure 4:
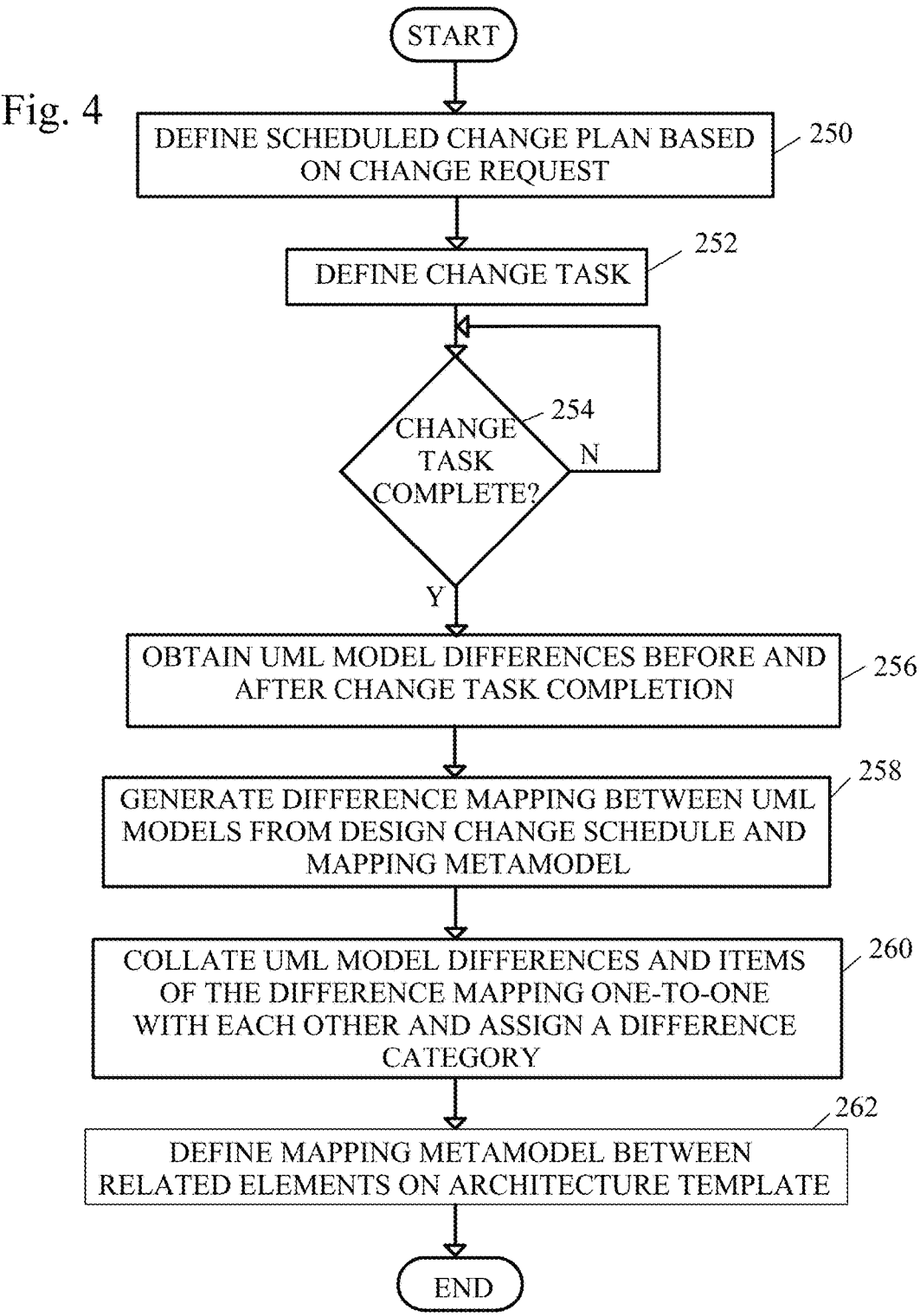
FIG. 4 shows a flow diagram of a method of verifying differences were made to the UML model via the mapping metamodel.

In the Verification Mode, which is discussed further in FIGS. 3 and 4, the model differences are inspected by the Model Difference Mapping, and are categorized, such as "planned and realized difference", "planned and unrealized difference", and "unplanned difference". In addition, it is also possible to verify the validity of the changes in the entire UML model, by analyzing the impact of the differences with the relevant Mapping Metamodels and detecting the spread of the planned changes.

Figure 2:
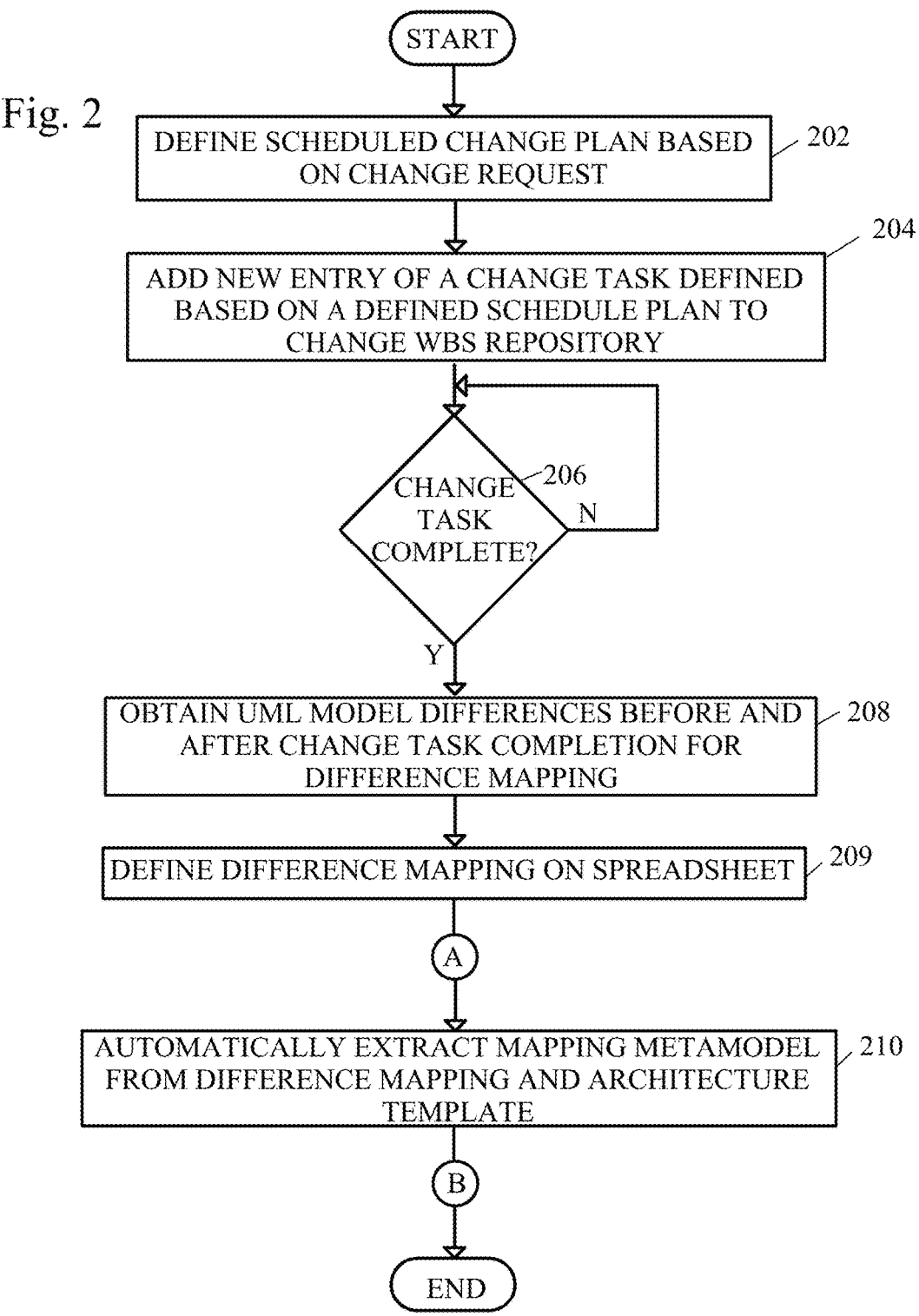
FIG. 2 shows a flow diagram of a method of learning differences to generate a mapping metamodel.

FIG. 2 shows a flow diagram of a method of learning differences to generate a mapping metamodel.

In a first step, a scheduled change plan is defined based on a change request received from an administrator (step 202). The design change schedule is stored in a design change schedule repository 102 of the schedule definition domain of design change 101. The design change schedule preferably includes data regarding the data model change and interface change on a per-type basis, as well as the operation time to determine the difference extraction interval.

A new entry of a change task definition based on the defined schedule change plan is added to a change WBS repository (step 204). The change WBS repository 103 for a change task is defined on the basis of the change requests to control the operations and tasks associated with the UML model change. Operation time required to complete the change task can be updated during execution of the change task.

Completion of the change task is confirmed (step 206). The confirmation is preferably sent by the change WBS repository 103 to the UML Model Difference repository 107.

UML model differences are then obtained by comparing the UML model prior to the change task and the UML model after the change task has been completed (step 208). The UML model differences are preferably stored in the UML model difference repository 107. The differences or UML model differences can be categorized as creation, update, and deletion, and can be extracted by using an existing products, tools and techniques. The UML model difference can be used to classify each entry of the UML model differences obtained.

The difference mapping between the UML model after the change task has been complete and the changes requested is mapped to a spreadsheet (step 209).

A mapping metamodel is automatically extracted from the difference mapping and the architecture template (step 210) and the method ends.

Figure 9:
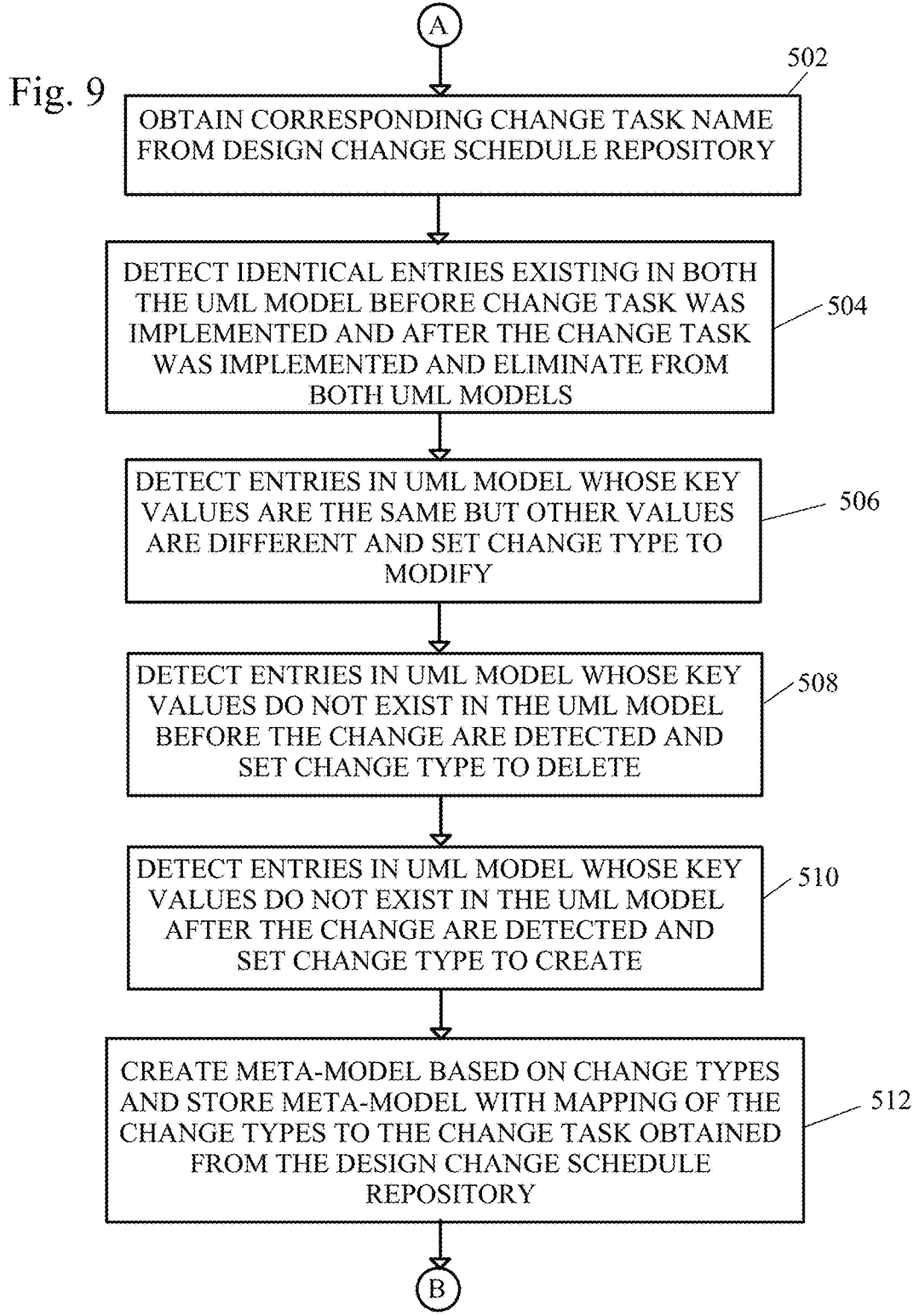
FIG. 9 shows a flow diagram of the steps of create and extract a corresponding mapping metamodel from difference mapping.

FIG. 9 shows a flow diagram of the steps of create and extract a corresponding mapping metamodel from difference mapping.

In a first step, the corresponding change task name is obtained from the design change schedule repository (step 502).

Identical entries existing in both the UML model before the change task was implemented and after the change task was implemented are detected and eliminated from both UML models (step 504).

Next, entries in UML model whose key values (*1) are same but the other values are different are detected and the change type is set to "Modify" (step 506).

The entries in the UML model before the change task was implemented whose key values (*1) do not exist in the UML model after the change are detected and the change type is set to "Delete" (step 508).

The entries in the UML model after the change whose key values do not exist in the UML model after the change are detected and set the change type to "Create" (step 510).

Based on the change types of the key entries, a metamodel is created, and the mapping metamodel is stored with mapping the changes types relative to the change task obtained from the design change schedule repository (step 512).

It should be noted that (*1) key values are defined for each model element in advance. For example, the key values for "Method Parameter" are stereo type, class name, method name and parameter name.

FIG. 3 shows the architecture system of FIG. 4 in verification mode. In verification mode, the difference control domain 108 includes a difference classification repository 111 in addition to the difference mapping repository 109, and a mapping metamodel repository 110. The difference classification repository 111 stores schedule-versus-result difference, schedule-versus-unrealized difference, and unscheduled difference. The unscheduled difference is a difference in a case where difference mapping does not occur, although it is expected to be present.

The difference classification is used to show the result of verification for each difference of the changes in the UML model. For example, if a difference is classified as "planed and realized difference (*1)" or "implemented scheduled difference", the change is correct. On the other hand, if a difference is classified as "Unplanned difference (*2)" or "unscheduled difference", the change is incorrect. If there is a mapping metamodel that there is no corresponding change to, "planned and unrealized difference (*3)" or "unimplemented scheduled difference" label is used to specify the incorrectness to show the missing change. Since these labels are set during the verification process, we don't think it is necessary to prepare a repository such as the repository 111 to store them.

In addition, the mapping metamodel repository 110 provides input to the difference mapping repository 109.

In the Verification Mode, the model differences are inspected by the Model Difference Mapping, and are categorized, such as "planned and realized difference", "planned and unrealized difference", and "unplanned difference". In addition, it is also possible to verify the validity of the changes in the entire UML model, by analyzing the impact of the differences with the relevant Mapping Metamodels and detecting the spread of the planned changes.

FIG. 4 shows a flow diagram of a method of verifying differences were made to the UML model via the mapping metamodel.

In a first step, a scheduled change plan is defined based on a change request received from an administrator (step 250). The design change schedule is stored in a design change schedule repository 102 of the schedule definition domain of design change 101. The design change schedule preferably includes data regarding the data model change and interface change on a per-type basis, as well as the operation time to determine the difference extraction interval.

A new entry of a change task definition based on the defined schedule change plan is added to a change WBS repository (step 252). The change WBS repository 103 for a change task is defined on the basis of the change requests to control the operations and tasks associated with the UML model change. Operation time required to complete the change task can be updated during execution of the change task.

Completion of the change task is confirmed (step 254). The confirmation is preferably sent by the WBS repository 103 to the UML Model Difference repository 107.

UML model differences are extracted by comparing the UML model prior to the change task and the UML model after the change task has been completed (step 256). The UML model differences are preferably stored in the UML model difference repository 107.

From the design change schedule and mapping metamodel, changes, on a per type basis, are applied to automatically generate the difference mapping between UML models (step 258). Difference mapping on the UML model is defined indicating the scheduler versus the result differences to indicate the changes made as intended during the change schedule. The difference mapping created in this step is the "planned" difference mapping and is based on applying the mapping metamodel created in the learning mode to the design change plan of the design change schedule.

The UML model differences and items of the difference mapping are collated one-to-one with each other and assigned a difference category (step 260). The difference categorization may be: implemented schedule difference, unimplemented schedule difference, unscheduled difference. The difference mapping corresponds to the change task and validates the actual model differences by comparing the actual differences with the planned differences derived by the Model Difference Mapping. An unscheduled difference is a difference of a case in which difference mapping fails to match. The difference can be a candidate for implementation by learning the difference.

The mapping metamodel between related elements on the architecture template is defined (step 262) and the method ends. Optionally, at the time of verification, whether the impacts of the differences need to be verified or not can be specified.

FIGS. 5-8 show the method of the present invention exemplified using a banking account on-line system as a reference model. It should be noted that the present invention can be applied to any UML model in which changes are implemented of any system and is not limited to a financial banking system.

Figure 5:
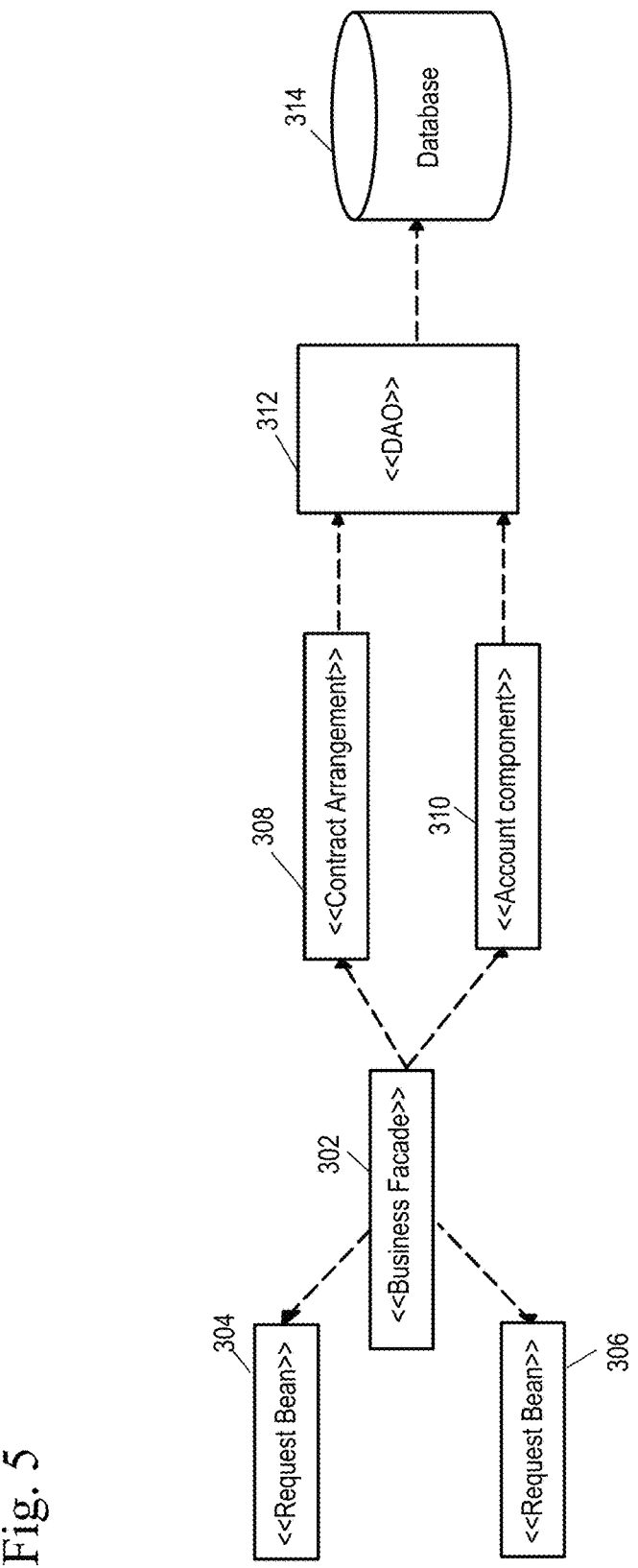
FIG. 5 shows an example of a stereotype-based component diagram of an architecture template.

FIG. 5 shows the architecture template of an example of a banking system. The architecture template is a template defining the structure of the application to be developed. Per the application to be developed, an architecture template defines call hierarchy of components and responsibility of the components according to the nature and scale of the application. When designing an application using UML modeling, the model representing the architecture template is called architecture template model.

Referring to FIG. 5, a business façade component 302 is connected to request bean 304, a response bean 306, and in communication with a contract arrangement component 308, and an account component 310. The contract arrangement component 308 and the account component 310 are in communication with a Decentralized Autonomous Organization (DAO) component 312. The DAO component 312 is in communication with a database 314.

The business façade component 302 receives requests from channel systems (ATMs, branches' terminal systems, etc.). The request bean 304 provides an input message for the business façade component 302. The response bean 306 provides an output message for the business façade component 302. The contract arrangement component 308 is an operation component that provides services associated with the contract between a customer and a bank. The account component 310 is an operation component which manages and operates accounts for individual customers. The DAO component 312 conceals input/output (I/O) and structured query language (SQL) processing for a database from the operation components.

Figure 6:
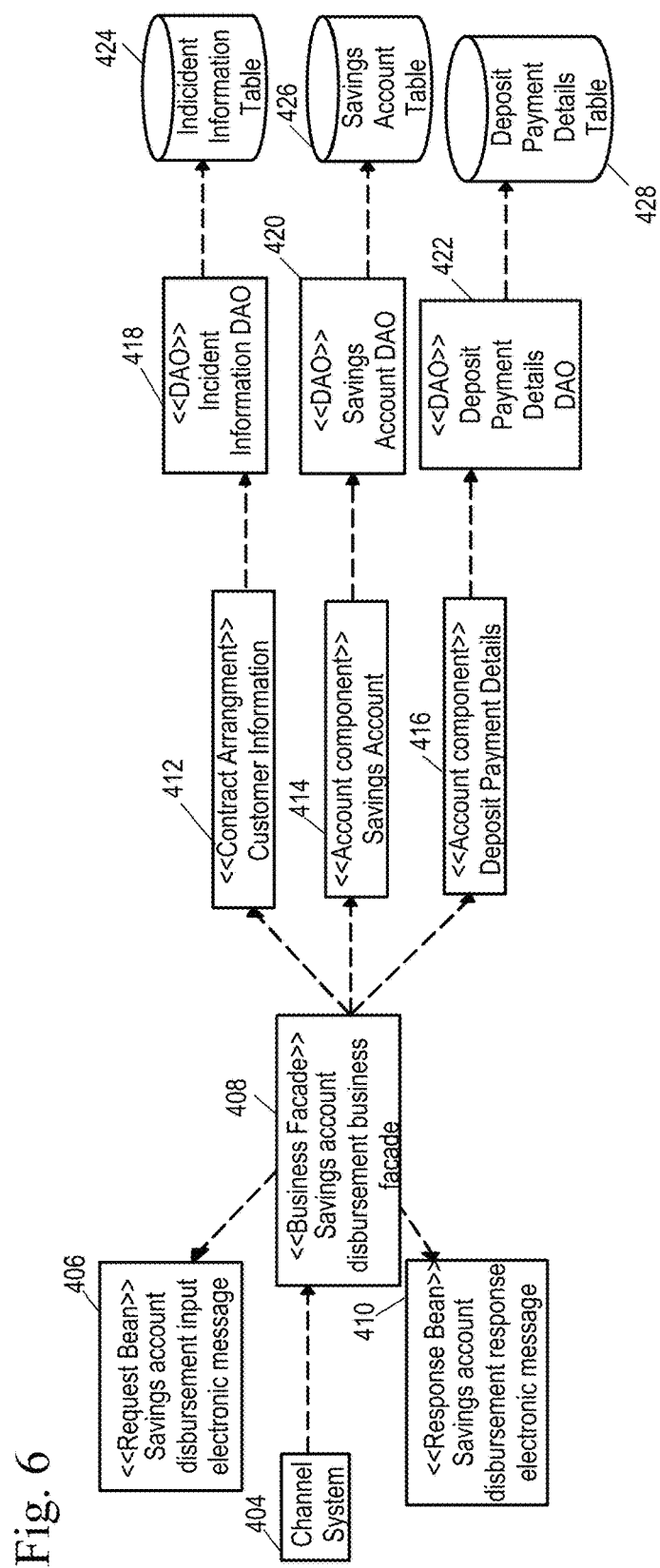
FIG. 6 shows an example of a UML model based on the architecture template.

FIG. 6 shows an example of a UML model based on the architecture template for a savings account disbursement use case and the component diagram of FIG. 5.

A channel system 404 is connected to a business façade component 408. The business façade component 408 is a savings account disbursement business façade for this example. The business façade component 408 is connected to a request bean 406 and a response bean 410. The request bean 406 is a savings account disbursement input electronic message. The response bean 410 is a savings account disbursement response electronic message.

The business façade component 408 is also in communication with a contract arrangement component 412, and account components 414, 416. The contract arrangement component 412 includes information regarding the customer. The account component 414 includes savings account information and the account component 416 includes deposit payment details.

The contract arrangement component 412 communicates with the DAO component 418 that includes incident information DAO. The DAO component 418 is in communication with an incident information table 424.

The account component 414 is in communication with DAO component 420. The DAO component 420 includes savings account DAO and is in communication with a savings account table 426.

The account component 416 is in communication with DAO component 422. The DAO component 422 includes deposit payment details DAO and is in communication with a deposit details table 428.

The event flow for a customer making a payment from the savings account, would occur as follows: checking that the customer is not a customer with previous incidents; check that the amount of payment is less than or equal to the amount of the balance; set amount of the balance to the difference between the amount of the balance and the amount of the payment; and make a registration in the deposit payment history.

Figure 7:
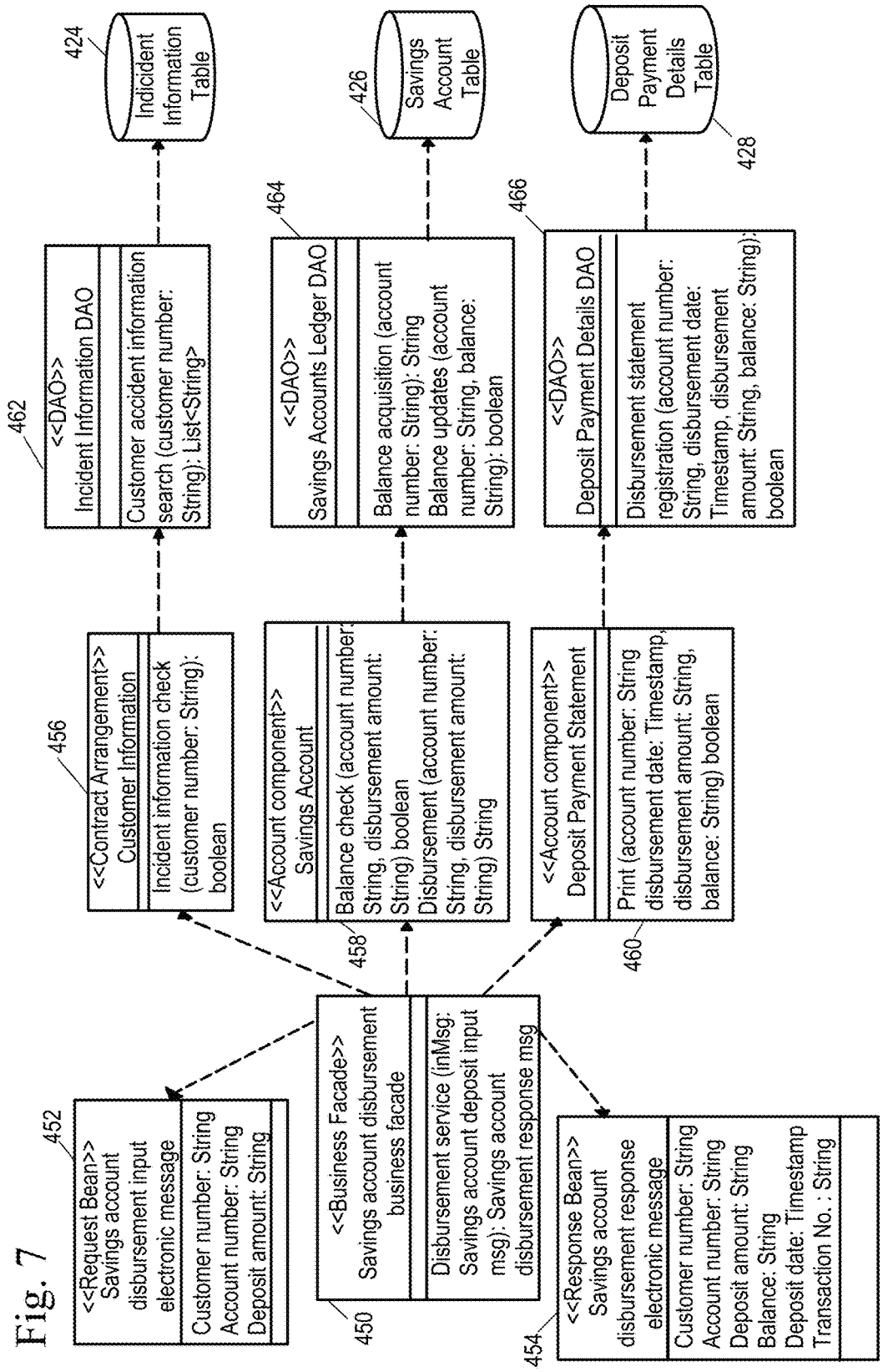
FIG. 7 shows an example of UML model prior to changes being made.

FIG. 7 shows an example of a UML model prior to changes being made. The UML model prior to the changes being made may be stored in the UML model repository 105 of the change domain 104.

The business façade 450 can execute disbursement services. Some examples include savings account deposit input messages and savings account disbursement response messages.

The savings account disbursement input message 452 has the attributes of: a customer number string, an account number string, and a deposit amount string.

The savings account disbursement response message 454 has the attributes of: a customer number string, an account number string, a deposit amount string, a balance string, a deposit date with a timestamp, and a transaction number string.

The customer information 456 has the operations of an incident information check via Boolean search using a customer number string.

The savings account 458 has the operations of: a balance check via Boolean search using account number string and disbursement amount string and a disbursement search via Boolean search using account number string and disbursement amount string.

The deposit payment statement 460 has the operations of entry of data. The data may be, for example account number string, disbursement date, timestamp, disbursement amount string and balance string.

The incident information DAO 462 has operations of customer accident information search. The customer accident search may be via customer number string.

The savings account ledger DAO 464 has operations of balance acquisition and balance updates. The balance acquisition is via the account number string. The balance updates is via the account number and balance strings.

The deposit payment details DAO 466 has operations of disbursement statement registration. The operations of disbursement statement registration are via account number string, disbursement date, disbursement amount, and balance.

Figure 8:
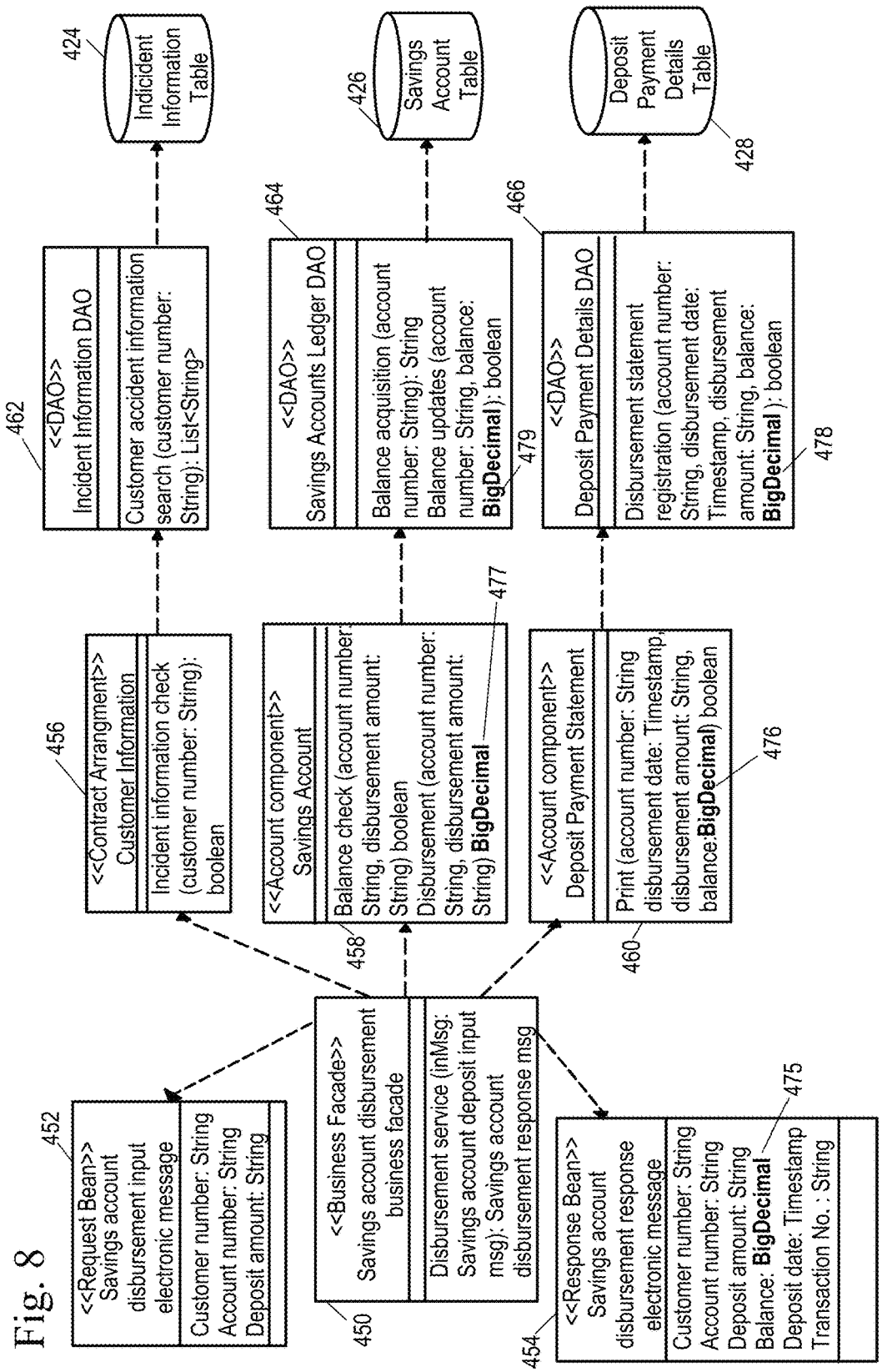
FIG. 8 shows an example of a UML model after the changes have been made.

FIG. 8 shows an example of a UML model after the changes have been made. The UML model after the changes have been made may be stored, for example in the UML model difference repository 107. It should be noted that the change task executed on the UML model of FIG. 7 may be executed by the change WBS 103.

The detected changes to the UML model in learning mode are indicated by reference numbers 475-479. More specifically, the balance string of the response bean component 454 is changed 475 to big decimal. The balance of the account component 460 is changed 476 from string to big decimal. The disbursement string of the account component 458 corresponding to savings account is changed 477 from string to big decimal. The balance string of the DAO component 466 corresponding to deposit payment details statement is changed 478 from string to big decimal and the balance of the DAO component 464 corresponding to savings account ledger DAO is changed 479 from string to big decimal. A result of changing "string" to "big decimal" in the DAO component 466 and DAO component 464 representing a customer balance, causes the balance being stored in the savings account table 426 and the deposit payment details 428 to change from character (CHAR) to decimal. This change in the tables is a resultant change from the scheduled changes to the DAO components. The mapping metamodel would be generated based on the UML model of FIG. 8.

An example of a model element difference extraction list and a mapping metamodel candidate based on the changes requested and the differences mapped between the UML model of FIGS. 7 and 8 or difference mapping is shown in Table 1.

TABLE 1

| Model Element | Stereo Type | Class Name | Method Name | Parameter Name | Change Type | Content of Change | |
|---|---|---|---|---|---|---|---|
| | | | | | | From | To |
| Method Parameter | DAO | Savings Account Ledger DAO | Balance updates | Balance | Modify | String | BigDecimal (10.3) |
| Method Parameter | DAO | Deposit Payment Details DAO | Register Disbursement details | Balance (return value) | Modify | String | BigDecimal (10.3) |
| Method Parameter | Account component | Savings account | Disbursement | Balance | Modify | String | BigDecimal (10.3) |
| Method | Account | Deposit | Print | Balance | Modify | String | BigDecimal |

TABLE 1-continued

| Model | | | | Parameter | Change | Content of Change | |
|---|---|---|---|---|---|---|---|
| Element | Stereo Type | Class Name | Method Name | Name | Type | From | To |
| Parameter | component | payment details | | | | | (10.3) |
| Attribute | Response Bean | Savings account disbursement response message | — | Balance | Modify | String | BigDecimal (10.3) |

Example of mapping metamodel derived from the "difference mapping" of Table 1:
Table.attribute.type.change/name→
  →<<DAO>>:methodParameter.type.change/name
  →<<Account Component>>:methodParameter.type.change/name
  →<<Account Component>>:methodReturn.type.change/name
  →<<Response Bean>>:attribute.type.change/name A description of the mapping metamodel based on the above example is shown in Table 2.

TABLE 2

| Database Table Attribute Type Changes | Changes Associated with Item Name |
|---|---|
| As to architecture template <<DAO>> | The type of a method parameter is changed; the change associated with item name |
| As to architecture template <<AccountantComponent>> | The type of a method parameter is changed; the change associated with item name |
| As to architecture template <<AccountantComponent>> | A method return value is changed; the change associated with item name |
| As to architecture template <<ResponseBean>> | The type of an attribute (member variable) (is changed; the change associated with item name |

Figure 10:
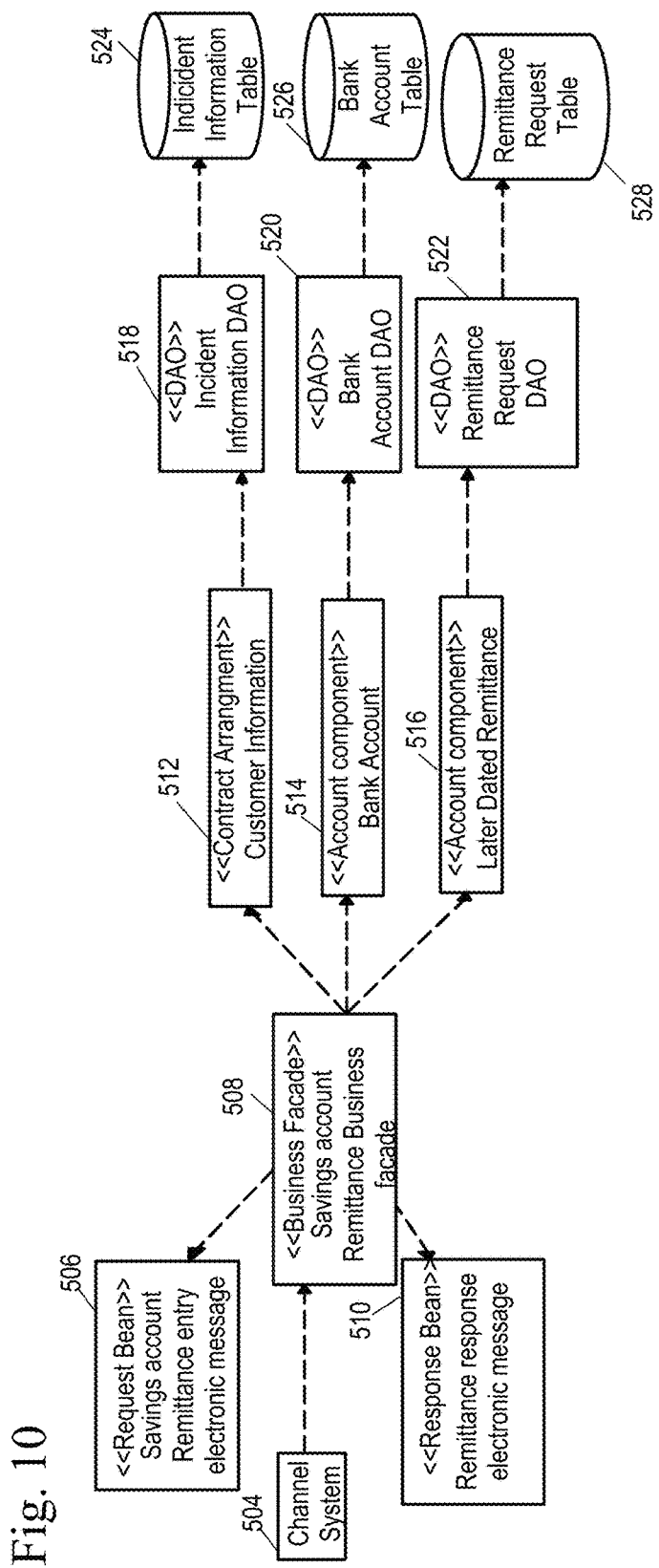
FIG. 10 shows another example of a UML Model based on the architecture template.
Figure 11:
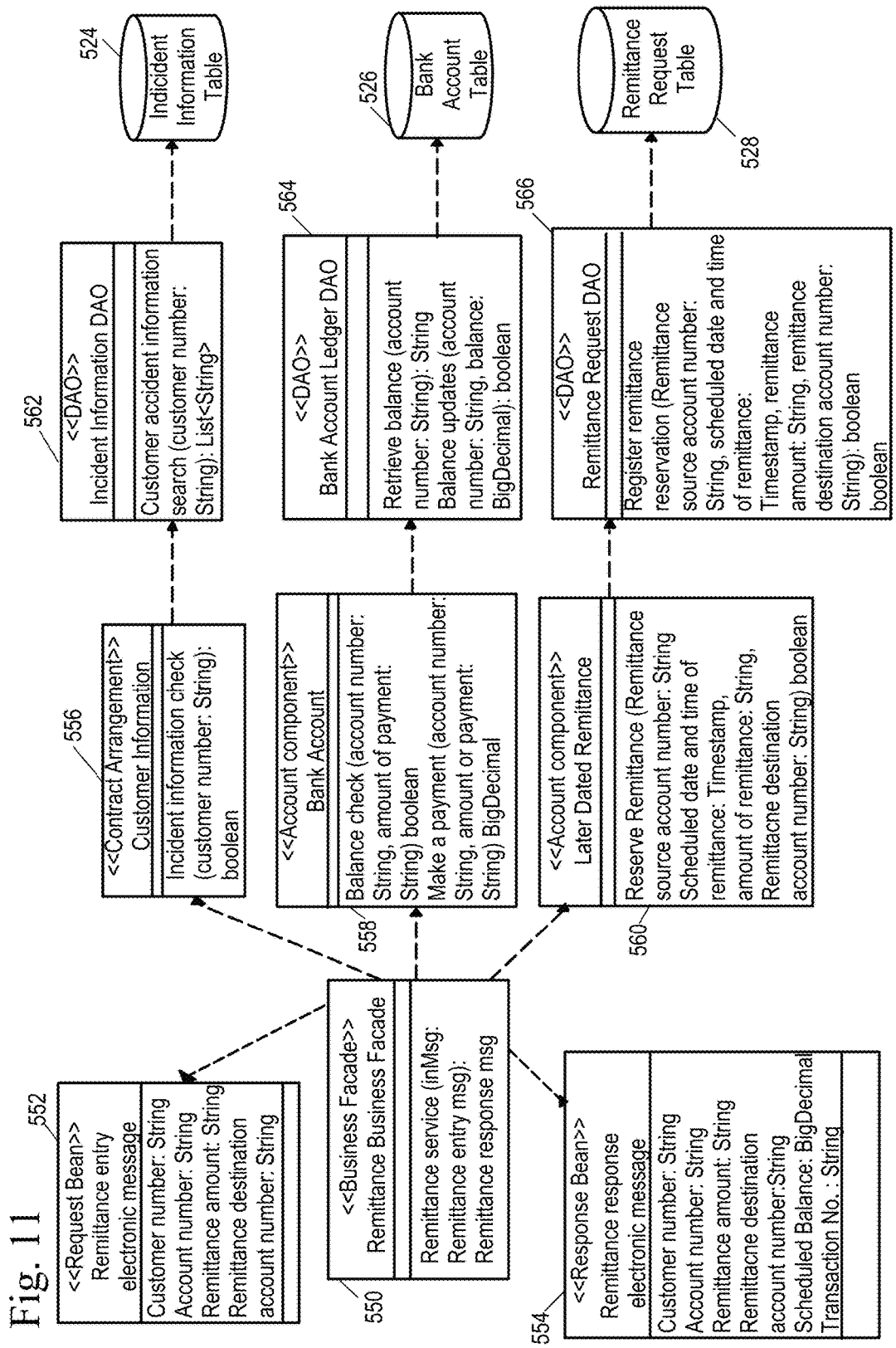
FIG. 11 shows another example of a UML model prior to changes being made.
Figure 12:
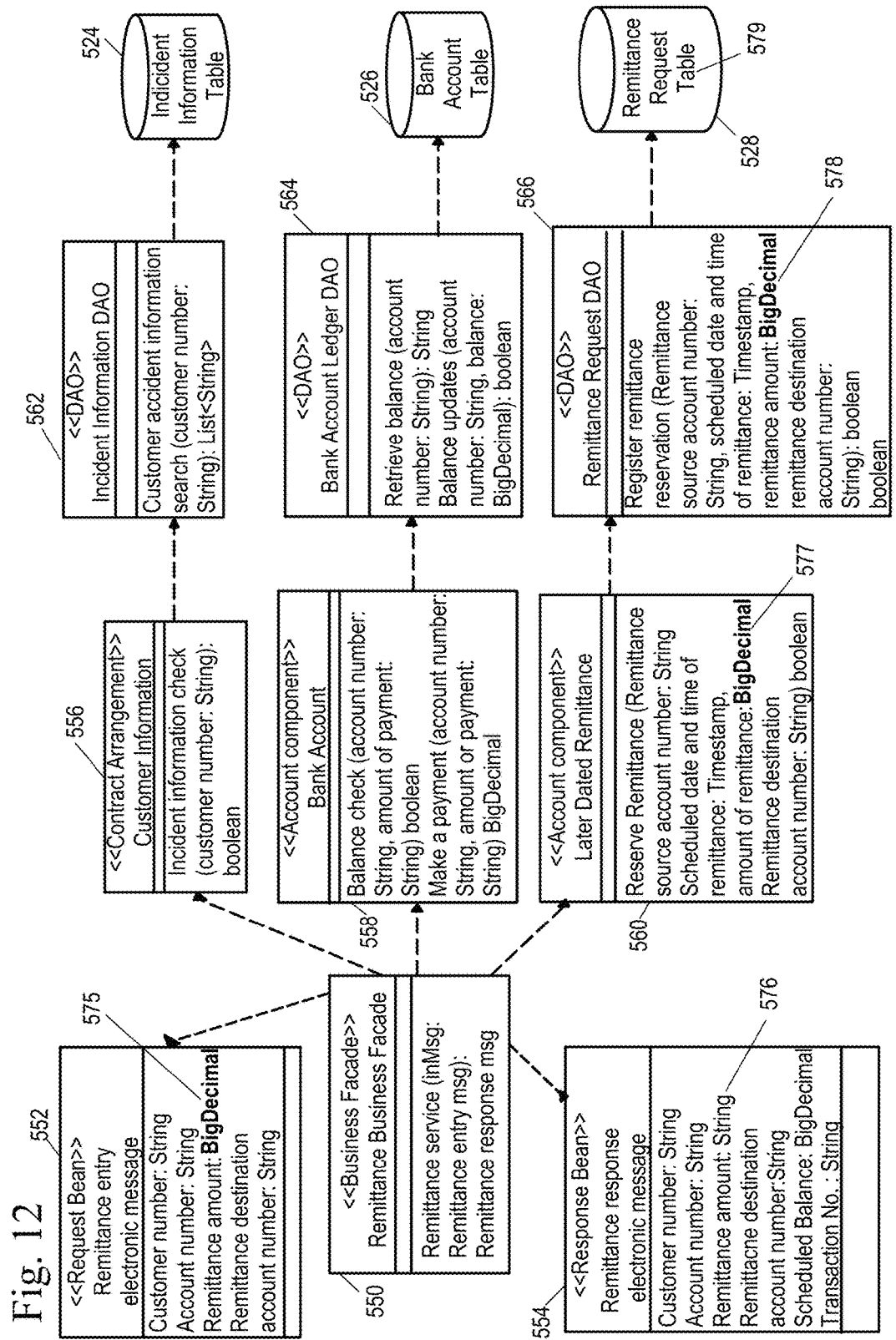
FIG. 12 shows another example of a UML model with changes made.

FIGS. 10-12 show the method of the present invention exemplified using a banking account on-line system as a reference model. It should be noted that the present invention can be applied to any UML model in which changes are implemented of any system and is not limited to a financial banking system.

FIG. 10 shows an example of a UML model based on the architecture template for a savings account disbursement use case and the component diagram of FIG. 5.

A channel system 504 is connected to a business façade component 508. The business façade component 508 is a remittance business façade for this example. The business façade component 508 is connected to a request bean 506 and a response bean 510. The request bean 506 is a remittance entry electronic message. The response bean 510 is a remittance response electronic message.

The business façade component 508 is also in communication with a contract arrangement component 512, and account components 514, 516. The contract arrangement component 512 includes information regarding the customer. The account component 514 includes bank account information and the account component 416 includes later dated remittance details.

The contract arrangement component 512 communicates with the DAO component 518 that includes incident information DAO. The DAO component 518 is in communication with an incident information table 524.

The account component 514 is in communication with DAO component 520. The DAO component 520 includes bank account DAO and is in communication with a bank account table 526.

The account component 516 is in communication with DAO component 522. The DAO component 522 includes remittance request details DAO and is in communication with a remittance request table 528.

The event flow for a customer making a later dated remittance from a bank account, would occur as follows: checking that the customer is not a customer with previous incidents; checking for the remittance source account; recording information on the remittance destination account, the date of remittance and the amount of remittance in a request table.

FIG. 11 shows an example of a UML model prior to changes being made. The UML model prior to the changes being made may be stored in the UML model repository 105 of the change domain 104.

The business façade 550 can execute remittances. Some examples include remittance input messages and remittance response messages.

The remittance input message 552 has the attributes of: a customer number string, an account number string, amount of remittance string, and a remittance destination account number string.

The remittance response message 554 has the attributes of: a customer number string, an account number string, a remittance amount string, a remittance destination account number string, a scheduled balance in big decimal, and a transaction number string.

The customer information 556 has the operations of an incident information check via Boolean search using a customer number string.

The bank account 558 has the operations of: a balance check via Boolean search using account number string and amount of payment string and a make a payment operation with account number string, amount of payment string with big decimal.

The later dated remittance 560 has the operations of reserve remittance, which includes data of: remittance source account number string, schedule date and time of remittance via timestamp, amount of remittance string, and remittance destination account number string, all of which is searchable via Boolean search.

The incident information DAO 562 has operations of customer accident information search. The customer accident search may be via customer number string.

The bank account ledger DAO 564 has operations of balance retrieval and balance updates. The balance retrieval is via the account number string. The balance updates is via the account number string and balance big decimal.

The deposit payment details DAO 566 has operations of remittance request. The operations of registration of remittance reservation are via remittance source account number string, scheduled date and time of remittance via timestamp, amount of remittance string, and remittance destination account number string.

FIG. 12 shows an example of a UML model after design changes have been made to attributes of the database items. The UML model after the changes have been made may be stored, for example in the UML model difference repository 107. It should be noted that the change task executed on the UML model of FIG. 11 may be executed by the change WBS 103.

The detected changes to the UML model in learning mode that were made and that changes that were supposed to be made are indicated by reference numbers 575-579. These changes and changes that should have been made are verified in verification mode. More specifically, the type of amount of remittance was changed 579 from CHAR to DECIMAL. A design change 578 was made to the type of amount of remittance DAO to change the type from string to big decimal. A design change 577 was made to the type of the amount of remittance of the account component to change the type from string to big decimal. A design change 576 should have been made to the type of the amount of remittance of the response bean to change the type from string to big decimal. However the change was not made. The mapping metamodel would be generated based on the UML model of FIG. 12.

An example of a model element difference extraction list and a mapping metamodel candidate based on the changes requested and the differences mapped between the UML model of FIGS. 11 and 12 or difference mapping is shown in Table 3.

TABLE 3

| Model Element | Stereo Type | Class Name | Method Name | Parameter Name | Change Type | Content of Change From | Content of Change To |
|---|---|---|---|---|---|---|---|
| Method Parameter | DAO | Remittance request DAO | Register remittance reservation | Amount of remittance | Modify | String | BigDecimal (10.3) |
| Method Parameter | Account Component | Later dated remittance | Reserve remittance | Amount of remittance | Modify | String | BigDecimal (10.3) |
| Attribute | Response Bean | Remittance response message | — | Amount of remittance | Modify | String | BigDecimal (10.3) |

Example of mapping metamodel derived from the "difference mapping" of Table 3:

Table.attribute.type.change/name→
→<<DAO>>:methodParameter.type.change/name
→<<Account Component>>:methodParameter.type.change/name
→<<Response Bean>>:attribute.type.change/name It should be noted that a difference mapping item corresponding to "<<AccountingComponent>>:methodReturn.type.change/name" was not detected because there is no counterpart model element.

Table 3 shows the actual difference mapping. Collation of the scheduled difference mapping with the actual difference mapping (i.e. difference categorization) is shown in Table 4.

TABLE 4

| Model Element | Stereo Type | Class Name | Method Name | Parameter Name | Change Type | Content of Change From | Content of Change To | Collation Result |
|---|---|---|---|---|---|---|---|---|
| Method Parameter | DAO | Remittance request DAO | Register remittance reservation | Amount of remittance | Modify | String | BigDecimal (10.3) | Implemented scheduled difference |
| Method Parameter | Account Component | Later dated remittance | Reserve remittance | Amount of remittance | Modify | String | BigDecimal (10.3) | Implemented scheduled difference |
| Attribute | Response Bean | Remittance response message | — | Amount of remittance | Modify | String | BigDecimal (10.3) | Unimplemented scheduled difference |
| Attribute | Request Bean | Remittance entry message | — | Amount of remittance | Modify | String | BigDecimal (10.3) | Unscheduled difference |

The change made to the type of "account remittance" of <<Request Bean>> remittance entry message, where string was changed to big decimal was detected as an unscheduled difference, becomes a candidate for registration of a change to the metamodel. The change made to the type of "amount of remittance" of <<Response Bean>> remittance response message, where string was changed to big decimal was detected as an unimplemented scheduled difference and becomes an instruction for a design change.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of learning and verifying differences to generate a mapping metamodel of a unified modeling language model comprising the steps of:
   a computer defining a design change schedule based on a change request received from an administrator, the design change schedule comprising a design change plan comprising data regarding data model changes and interface changes on a per-type basis;
   the computer defining and executing a change task based on the change request to control the operations and tasks associated with changes to the unified modeling language model;
   the computer confirming completion of the change task designated by the design change plan of the design change schedule on the unified modeling language model;
   the computer obtaining unified modeling language model differences by comparing the unified modeling language model prior to the change task being executed and the unified modeling language model after the change task has been completed;
   the computer mapping the unified modeling language model differences by comparing the unified modeling language model differences to expected data model changes defined by the design change plan to indicate what changes were made as intended during the design change schedule to create model difference mapping; and
   the computer extracting a mapping metamodel from the difference mapping comprising the steps of:
      the computer obtaining a corresponding change task name from a design change schedule repository associated with the design change schedule;
      the computer detecting identical entries existing in both a UML model before a change task was implemented and a UML model after the change task was implemented;
      the computer removing detected identical entries from the UML model before the change task was implemented and the UML model after the change task was implemented;
      the computer detecting the entries in the UML model before the change task was implemented and the UML model after the change task was implemented with key values that are the same, but other values which are different and for each of those detected entries, the computer setting a change type for those entries to modify;
      the computer detecting entries in the UML model after the change task was implemented with key entries that do not exist in the UML model before the change task was implemented, the computer setting a change type for those entries to create; and
      the computer creating a meta model based on the change types mapping the change types to the change task name of the design change schedule.

2. The method of claim 1, wherein the design scheduled change plan further comprises an expected time to complete the change request.

3. The method of claim 1, wherein the design scheduled change schedule further comprises definitions of design changes requested on a per-type basis for model difference mapping.

4. The method of claim 1, wherein the differences are verified by the steps of:
   the computer individually assigning difference classifications to the unified modeling language model differences and the difference mapping; and
   the computer verifying impacts of the difference changes based on the difference classifications.

5. A computer program product for learning and verifying differences to generate a mapping metamodel of a unified modeling language model, a computer comprising at least one processor, one or more memories, one or more computer readable storage media, the computer program product comprising a computer readable storage medium having program instructions embodied therewith, the program instructions executable by the computer to perform a method comprising:
   defining, by the computer, a design change schedule based on a change request received from an administrator, the design change schedule comprising a design change plan comprising data regarding data model changes and interface changes on a per-type basis;
   defining, by the computer, and executing a change task based on the change request to control the operations and tasks associated with changes to the unified modeling language model;
   confirming, by the computer, completion of the change task designated by the design change plan of the design change schedule on the unified modeling language model;
   obtaining, by the computer, unified modeling language model differences by comparing the unified modeling language model prior to the change task being executed and the unified modeling language model after the change task has been completed;
   mapping, by the computer, the unified modeling language model differences by comparing the unified modeling language model differences to expected data model changes defined by the design change plan to indicate what changes were made as intended during the design change schedule to create model difference mapping; and
   extracting, by the computer, a mapping metamodel from the difference mapping comprising:
      obtaining, by the computer, a corresponding change task name from a design change schedule repository associated with the design change schedule;
      detecting, by the computer, identical entries existing in both a UML model before a change task was implemented and a UML model after the change task was implemented;
      removing, by the computer, detected identical entries from the UML model before the change task was implemented and the UML model after the change task was implemented;
      detecting, by the computer, the entries in the UML model before the change task was implemented and the UML model after the change task was implemented with key values that are the same, but other values which are different and for each of those detected entries, the computer setting a change type for those entries to modify;
      detecting, by the computer, entries in the UML model after the change task was implemented with key entries that do not exist in the UML model before the change task was implemented, the computer setting a change type for those entries to create; and creating, by the computer, a meta model based on the change types mapping the change types to the change task name of the design change schedule.

6. The computer program product of claim 5, wherein the design scheduled change plan further comprises an expected time to complete the change request.

7. The computer program product of claim 5, wherein the design scheduled change schedule further comprises definitions of design changes requested on a per-type basis for model difference mapping.

8. The computer program product of claim 5, wherein the differences are verified by the program instructions of:

individually assigning, by the computer, difference classifications to the unified modeling language model differences and the difference mapping; and verifying, by the computer, impacts of the difference changes based on the difference classifications.

9. A computer system for learning and verifying differences to generate a mapping metamodel of a unified modeling language model, the system comprising a computer comprising at least one processor, one or more memories, one or more computer readable storage media having program instructions executable by the computer to perform the program instructions comprising:

defining, by the computer, a design change schedule based on a change request received from an administrator, the design change schedule comprising a design change plan comprising data regarding data model changes and interface changes on a per-type basis;

defining, by the computer, and executing a change task based on the change request to control the operations and tasks associated with changes to the unified modeling language model;

confirming, by the computer, completion of the change task designated by the design change plan of the design change schedule on the unified modeling language model;

obtaining, by the computer, unified modeling language model differences by comparing the unified modeling language model prior to the change task being executed and the unified modeling language model after the change task has been completed;

mapping, by the computer, the unified modeling language model differences by comparing the unified modeling language model differences to expected data model changes defined by the design change plan to indicate what changes were made as intended during the design change schedule to create model difference mapping; and extracting, by the computer, a mapping metamodel from the difference mapping comprising:

obtaining, by the computer, a corresponding change task name from a design change schedule repository associated with the design change schedule;

detecting, by the computer, identical entries existing in both a UML model before a change task was implemented and a UML model after the change task was implemented;

removing, by the computer, detected identical entries from the UML model before the change task was implemented and the UML model after the change task was implemented;

detecting, by the computer, the entries in the UML model before the change task was implemented and the UML model after the change task was implemented with key values that are the same, but other values which are different and for each of those detected entries, the computer setting a change type for those entries to modify;

detecting, by the computer, entries in the UML model after the change task was implemented with key entries that do not exist in the UML model before the change task was implemented, the computer setting a change type for those entries to create; and creating, by the computer, a meta model based on the change types mapping the change types to the change task name of the design change schedule.

10. The computer system of claim 9, wherein the design scheduled change plan further comprises an expected time to complete the change request.

11. The computer program product of claim 9, wherein the design scheduled change schedule further comprises definitions of design changes requested on a per-type basis for model difference mapping.

12. The computer program product of claim 9, wherein the differences are verified by the program instructions of:

individually assigning, by the computer, difference classifications to the unified modeling language model differences and the difference mapping; and verifying, by the computer, impacts of the difference changes based on the difference classifications.

* * * * *